United States Patent [19]

Tajima et al.

[11] Patent Number: 4,799,591

[45] Date of Patent: Jan. 24, 1989

[54] SHEET FILM PACKAGE AND METHOD AND DEVICE FOR LOADING SHEET FILM

[75] Inventors: Kenji Tajima; Noboru Arai, both of Kanagawa, Japan

[73] Assignee: Fuji Photo Film Co., Ltd., Kanagawa, Japan

[21] Appl. No.: 906,471

[22] Filed: Sep. 12, 1986

[30] Foreign Application Priority Data

Sep. 12, 1985 [JP] Japan ................................ 60-202441
Sep. 12, 1985 [JP] Japan ................................ 60-202442
Sep. 20, 1985 [JP] Japan ................................ 60-209762

[51] Int. Cl.$^4$ ............................................. B65D 81/30
[52] U.S. Cl. ...................................... 206/455; 378/182
[58] Field of Search ............... 206/449, 454, 455, 456, 206/605, 607, 608, 613, 633; 271/126, 127, 157, 162, 164; 354/82, 83, 86, 283; 355/72, 73; 378/182, 183

[56] References Cited

U.S. PATENT DOCUMENTS

| 3,352,479 | 11/1967 | Mohs | 206/605 |
| 3,740,237 | 6/1973 | Grindrod | 206/633 |
| 3,919,972 | 11/1975 | Komori et al. | 271/162 |
| 4,197,947 | 4/1980 | Zaidi | 206/807 |

FOREIGN PATENT DOCUMENTS

| 0047541 | 3/1982 | European Pat. Off. . | |
| 1522060 | 8/1970 | Fed. Rep. of Germany . | |
| 2503577 | 8/1976 | Fed. Rep. of Germany . | |
| 3100543 | 8/1982 | Fed. Rep. of Germany . | |
| 3209001 | 9/1983 | Fed. Rep. of Germany | 355/72 |
| 1379891 | 10/1964 | France | 206/633 |
| 1103844 | 2/1968 | United Kingdom . | |
| 2061231 | 5/1981 | United Kingdom | 271/127 |

Primary Examiner—Jimmy G. Foster
Attorney, Agent, or Firm—Sughrue, Mion, Zinn, Macpeak & Seas

[57] ABSTRACT

A sheet film package comprises a tray for storing a stack of sheet films and a flexible cover member peelably attached to the tray in covering relation to a film access opening in the tray for shielding the sheet films in the tray from extraneous light. By inserting the cover member into a cover member peeling passage defined in an image recording apparatus, the cover member is peeled off the tray to open the film access opening.

15 Claims, 8 Drawing Sheets

SHEET FILM PACKAGE AND METHOD AND DEVICE FOR LOADING SHEET FILM

BACKGROUND OF THE INVENTION

1. Field of the invention

The present invention relates generally to a sheet film package and a method of and a device for loading sheet film, and more particularly to a package for containing a plurality of sheet films, the package including a flexible light-shielding cover member, and a method of and a device for loading sheet films into an image recording apparatus or the like under bright conditions by inserting the light-shielding cover member into a passage defined in the image recording apparatus and peeling the cover member off the package therein.

2. Description of the prior art

X-ray films are widely used in the medical field for photographing objects such as human bodies with X rays for medical diagnosis. For photographing an object on such an X-ray film, it has been customary to load the X-ray film into an X-ray photographing device under a light-shielded environment and expose the emulsion layer of the film directly to an X ray having passed through the object for recording the image of the object thereon.

There has recently been developed and widely used especially in the medical field a radiation image recording and reproducing system for producing the radiation-transmitted image of an object using a stimulable phosphor material capable of emitting light upon exposure to stimulating rays. When a certain phosphor is exposed to a radiation such as X-rays, α-rays, β-rays, γ-rays, cathode rays, or ultraviolet rays, the phosphor stores a part of the energy of the radiation. When the phosphor exposed to the radiation is subsequently exposed to stimulating rays such as visible light, the phosphor emits light in proportion to the stored energy of the radiation. The phosphor exhibiting such a property is referred to as a "stimulable phosphor".

In the radiation image recording and reproducing system employing such a stimulable phosphor, the radiation image information of an object such as a human body is stored in a sheet having a layer of stimulable phosphor, and then the stimulable phosphor sheet is scanned with stimulating rays to cause the stimulable phosphor sheet to emit light representative of the radiation image. The emitted light is then photoelectrically detected to produce an image information signal that is electrically processed for generating image information which is recorded on a recording medium such as a photosensitive material or displayed as a visible image on a CRT or the like.

The visible image thus produced may be recorded on a recording medium by an image recorder such as an image output laser printer, for example. In the image output laser printer, photographic films stored as a recording material in a magazine are loaded,aand taken out one by one by a sheet delivery device such as a suction disk. Thereafter, the film is exposed to a laser beam modulated by an electric signal produced from the stimulable phosphor sheet for recording an image on the film. The exposed film is then transferred into an automatic developing device and processed thereby to develop the image. The film is thereafter placed on a stack of previously processed films.

When loading the films into the image output laser printer, they must not be exposed to extraneous light. There is however a strong demand for the loading of films under bright conditions such as in an ordinary bright room, and various xethods have been proposed for loading films in bright environments. One such method is disclosed in Japanese Laid-Open Utility Model Publication No. 56(1981)-5141.

The proposed method will be described with reference to FIGS. 1a and 1b of the accompanying drawings. FIG. 1a shows a film package 2 to be loaded into an X-ray photographing device. The film package 2 includes a light-shielded or sunproof container 6 in the form of a box having an opening 4. The light-shielded container 6 contains a pluraltiy of unexposed films 10 protected by cardboard 8. A flexible light-shielding member 12 is applied over the opening 4 in light-shielding relation to protect the unexposed films 10 from exposure to extraneous light. One end of the flexible light-shielding member 12 is curved upwardly and has an engagement hole 12a defined near its edge.

The film package 2 of the above construction is housed in a magazine 14 as shown in FIG. 1b and positioned by a storage unit 16. The magazine 14 has a shutter 18 having an engagement pin 20 mounted on one end thereof. After the engagement pin 20 has engaged in the hole 12a of the flexible light-shielding member 12, the magazine 14 is loaded into an X-ray photographing device (not shown), and the other end of the shutter 18 is pulled out of the magazine 14 by fingers. As a result, the flexible light-shielding member 12 is peeled off the container 6 by the pin 20 engaging the hole 12a, and the opening 4 is opened in the X-ray photographing device. The uppermost unexposed film 10 is then attracted by a suction device 22 and delivered through the opening 4 into a given photographing position.

With the illustrated conventional method, however, the dedicated magazine 14 must be used to store the film package 2. This magazine must be of a rugged construction capable of withstanding stresses due to repeated attachment and removal thereof, and hence is considerably heavy. Therefore, it is laborsome for the operator to load and unload the magazine. The magazine is also considerably expensive since it has a shutter mechanism. Where various films of different sizes are to be employed, there must be used as many dedicated magazines as the number of those different film sizes, and the cost of manufacture is so high that they are economically infeasible in reality.

SUMMARY OF THE INVENTION

Therefore, it is an object of the present invention to provide a sheet film package including a tray for accommodating a stack of sheet films and a flexible light-shielding cover member peelably bonded to the tray, and also a method of and a device for loading such sheet films into an image recording apparatus easily under a bright environment by inserting the tray and the cover member into an opening defined in the image recording apparatus and forcibly peeling the cover member off the tray.

According to the present invention, the above object can be achieved by a sheet film package comprising a tray for storing a stack of sheet films, the tray having a film access opening, and a flexible cover member peelably attached to the tray in covering relation to the film access opening for shielding the sheet films in the tray from extraneous light, the arrangement being such that by inserting the cover member into an image recording apparatus, the cover member is forcibly peeled off the tray to open the film access opening.

According to the present invention, there is also provided a method of loading a sheet film into an image recording apparatus having a sheet delivery mechanism, a loading opening, and a passage having one end communicating with the loading opening, the method comprising the steps of inserting a tray storing a stack of sheet films into the loading opening, positioning, in the passage, one end of a flexible cover member peelably attached to the tray in covering relation to a film access opening for shielding the sheet films from extraneous light, and moving the tray toward the sheet delivery mechanism to force the flexible cover member into the passage for thereby peeling the flexible cover member off the tray to open the film access opening, so that the sheet films can be delivered one by one therefrom by the sheet delivery mechanism.

According to the present invention, there is also provided a device for loading a sheet film, comprising a loading opening for introducing, into an image recording section for recording an image on the sheet film, a tray storing a stack of sheet films and having a film access opening, and a cover member peelably attached to the tray in covering relation to the film access opening for shielding the sheet films in the tray from extraneous light, and peeling means disposed near the loading opening for peeling the cover member off the tray.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWING

FIG. 8b is a side elevational view of the sheet film package shown in FIG. 8a;

DETAILED DESCRIPTION OF THE PREFERRED EMBODIMENTS

Figure 1A:
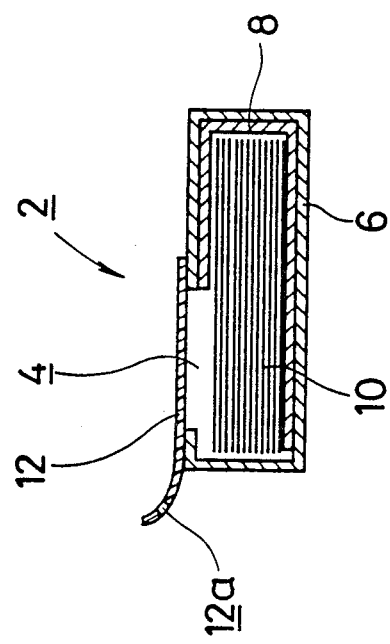
FIG. 1a is a cross-sectional view of a conventional film package.
Figure 1B:
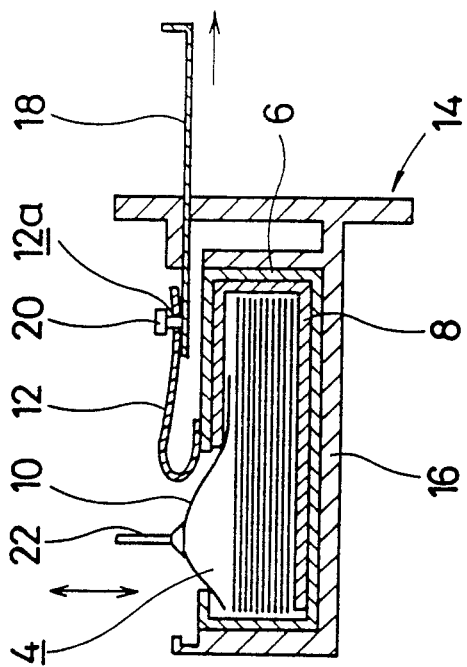
FIG. 1b is a cross-sectional view showing the manner in which the film package of FIG. 1a is loaded.

Identical parts are denoted by identical reference characters throughout several views.

Figure 2:
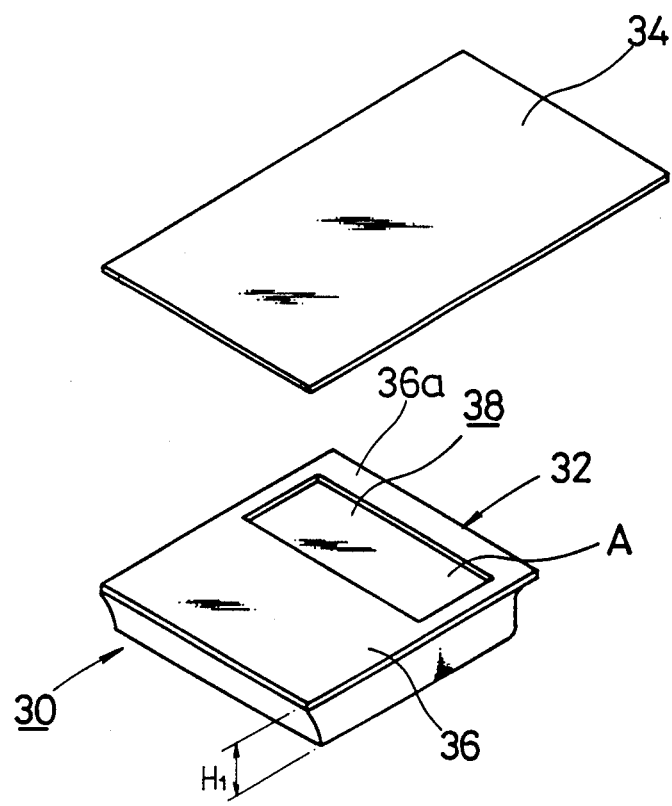
FIG. 2 is an exploded perspective view of a sheet film package according to the present invention.

FIG. 2 shows a sheet film package, generally designated by the reference numeral 30, according to the present invention. The sheet film package 30 comprises a tray 32 made of a synthetic resin material or cardboard having a desired degree of hardness, and a cover member 34 made of a flexible but slightly rigid material. The tray 32 has a height $H_1$ for housing a predetermined number of films A and includes a film access opening 38 of a certain width which is defined in an upper panel 36 near an end 36a thereof. The cover member 34 is peelably attached by adhesive or the like to the upper panel 36 in covering relation to the opening 38. One end of the cover member 34 projects outwardly from the end 36a of the tray 36.

Figure 3:
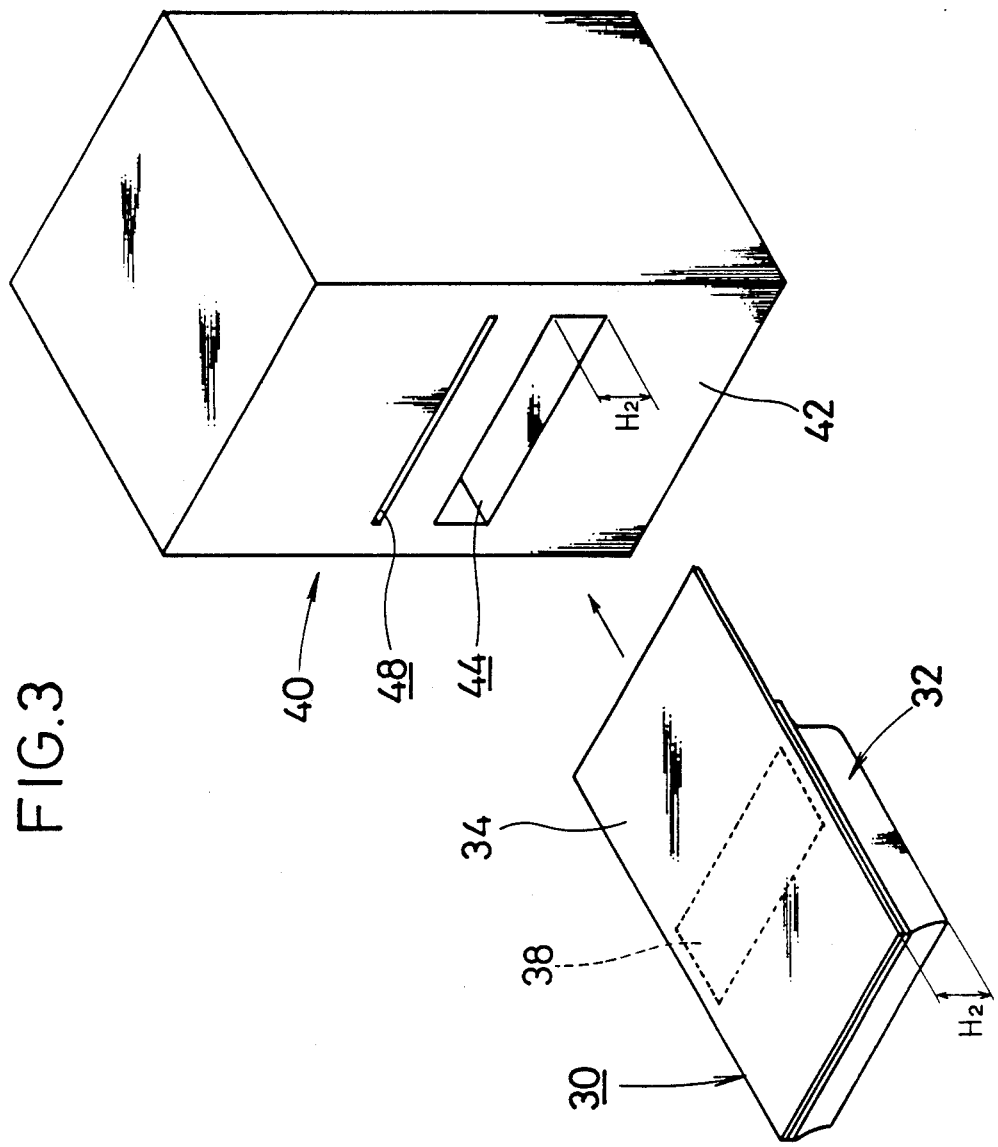
FIG. 3 is a perspective view of the sheet film package of the invention and an image recording apparatus into which the sheet film package is to be loaded.
Figure 4:
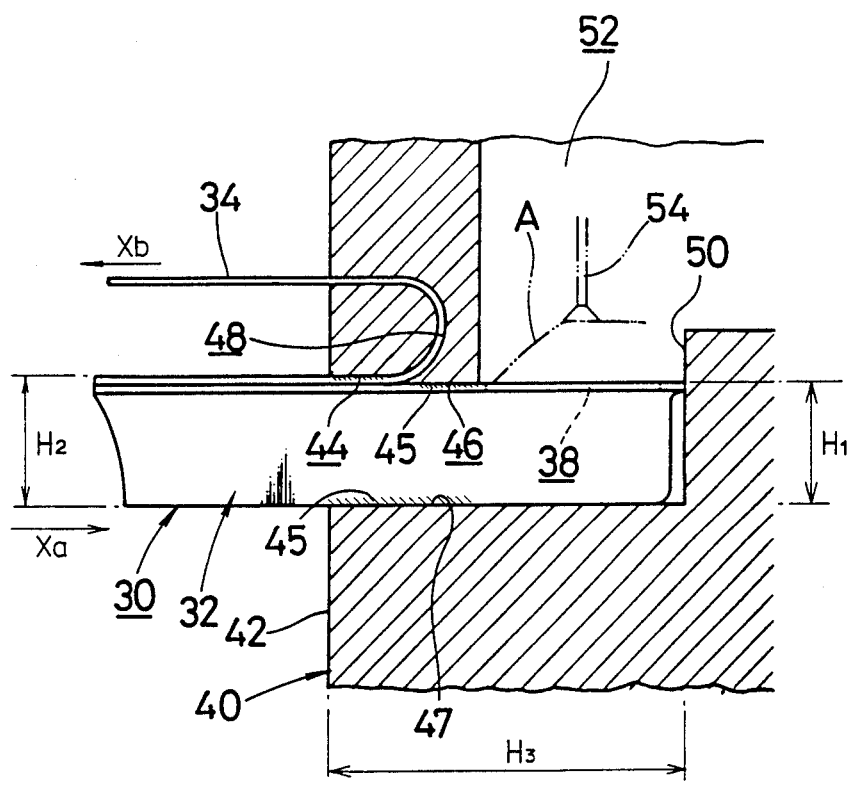
FIG. 4 is a fragmentary cross-sectional view showing the sheet film package loaded into the image recording apparatus.

As shown in FIGS. 3 and 4, an image recording apparatus 40 such as an image output laser printer includes a casing constructed to accommodate the sheet film package 30. The image recording apparatus 40 includes a front panel 42 having a first opening 44 of a rectangular cross section having a width $H_2$ in the direction of the height of the sheet film package 30 and a length which is the same as the width of the sheet film package 30. As shown in FIG. 4, the inner end of the first opening 44 communicates with a second opening 46 having a width equal to the height $H_1$ of the tray 32. The second opening 46 is defined in and extends inwardly from the front panel 42. The first and second openings 44, 46 are defined partly by a continuous bottom surface 47 lying at a constant height. The front panel 42 also includes a passage 48 extending arcuately upwardly from the boundary between the first and second openings 44, 46 and directed back and opening at the front surface of the front panel 42, the passage 48 having a cross section which is substantially the same as that of the cover member 34. The passage 48 includes an inlet opening into the openings 44, 46 and inclined upwardly at a certain angle to the horizontal direction. A vertical engagement surface 50 extends upwardly from the terminal end of the bottom surface 47 and is spaced from the front surface of the front panel 42 by a distance $H_3$ that is selected as a function of the length of the sheet film package 30. The image recording apparatus 40 has an inner chamber 52 in which a sheet delivery mechanism (not shown) including a suction disk 54 is disposed.

Raised fabric materials 45 are preferably applied to wall surfaces which define the first and second openings 44, 46 for increasing light-shielding capability in these openings 44, 46 when the sheet film package 30 is loaded as shown in FIG. 4.

Operation and advantages of the sheet film package 30 according to the present invention with respect to the image recording apparatus 40 will be described below.

The projecting distal end of the cover member 34 is inserted into the first opening 44 of the image recording apparatus 40 in the direction of the arrow Xa so that the cover member 34 is pressed slightly upwardly against the upper wall surface which partly defines the first opening 44. When the distal end of the cover member 34 reaches the inlet of the passage 48 which is inclined slightly upwardly, the cover member 34 enters the passage 48 since it is pressed slightly upwardly, and can move along the curved passage 48 by being pushed on.

Further displacement of the package 30 in the direction of the arrow Xa causes the tray 32 to be inserted into the second opening 46, and forces the cover member 34 through the passage 38 out of the front surface of the front panel 42, while at the same time the cover member 34 is being peeled off the upper panel 36 of the tray 32. The cover member 34 may be peeled off more smoothly by the operator gripping the emerging end of the cover member 34 and pulling it in the direction of the arrow Xb that is opposite to the direction of the arrow Xa in which the package 30 is inserted. It is also possible to force the tray 32 into the opening 46 by pulling the cover member 34 in the direction of the arrow Xb. Inasmuch as the opening 44 has the width that is the same as the height $H_2$ of the package 30 and has a certain depth into the image recording apparatus 40, no extraneous light enters the opening 38 of the tray 32 when the cover member 34 is peeled off the tray 32.

The package 30 is continuously inserted in the direction of the arrow Xa until its distal end engages the engagement surface 50. When the distal end of the package 30 engages the surface 50, the loading of the package 30 is finished. With the surface 50 and the front surface of the front panel 42 being spaced apart from each other by the distance $H_3$, the opening 38 of the tray 32 opens into the chamber 52 upon completion of the loading of the package 30. The sheet delivery mechanism including the suction disk 54 is actuated to deliver the films A one by one from the tray 32 into a recording section (not shown) for recording radiation image information thereon.

When all of the films A have been removed from the tray 32, the tray 32 is displaced in the direction of the arrow Xb to remove the package 30 out of the image recording apparatus 40. The tray 32 and the cover member 34 are now moved together out of the image recording apparatus 40.

Where the tray 32 is made of an inexpensive synthetic resin, cardboard or the like, the used package 30 may be discarded, and the provision of many different packages which meet various films of different sizes does not involve a substantial increase in the cost. Where various different films are employed, corresponding packages should preferably be provided with bar codes or magnetic tapes recording film types, film sizes, film lot numbers, and other data. When any of these packages is loaded into the image recording apparatus, such recorded data can be read and displayed by suitable readout means mounted in the image recording apparatus for giving the operator information necessary for image recording.

Figure 5:
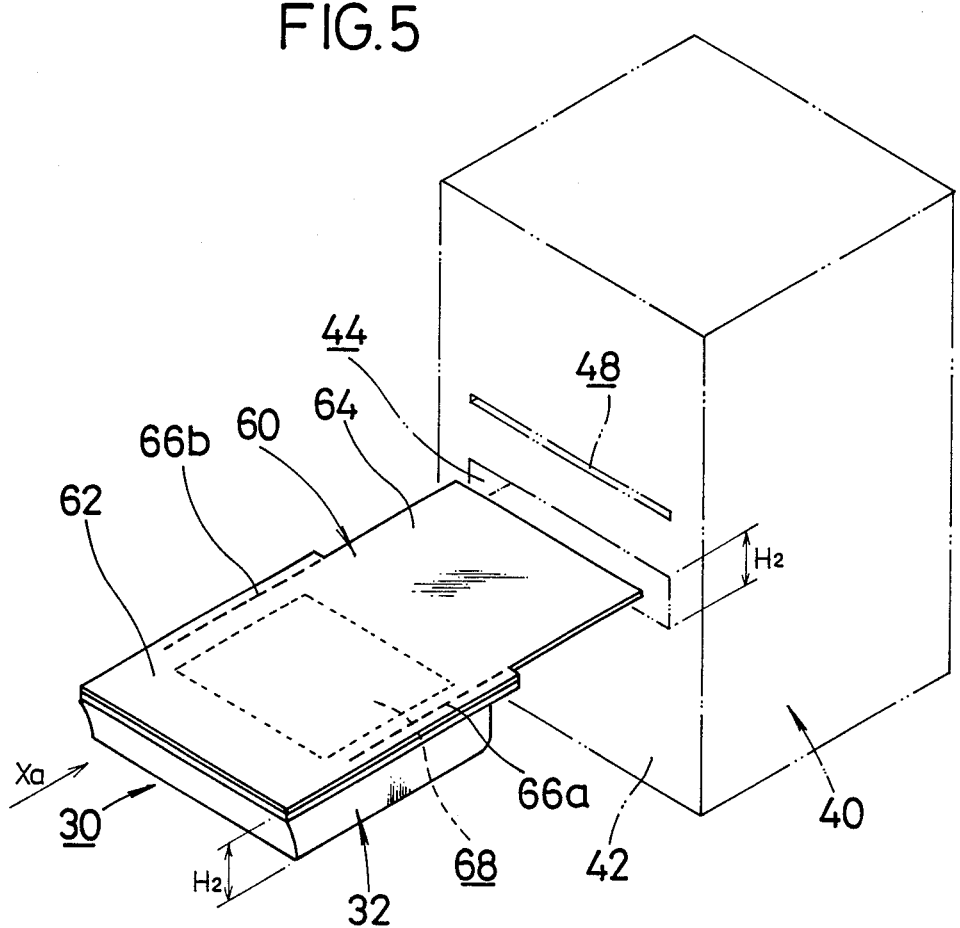
FIG. 5 is a perspective view of a sheet film package according to another embodiment of the present invention.

FIG. 5 shows a sheet film package according to another embodiment of the present invention. The sheet film package 30 includes a cover member 60 comprising a panel portion 62 having the same dimensions as those of the upper panel 36 of the tray 32 and a projecting portion 64 formed integral with and narrower than the panel portion 2. The panel portion 62 has two lines of break-off portions in the form of perforations 66a, 66b extending over a certain length and spaced a distance equal to the width of the projecting portion 64. The width of the projecting portion 64, i.e., the distance between the perforations 66a, 66b, is selected to be larger than the width of an opening 68 of the tray 32. The length of the projecting portion 64 is larger a prescribed dimension than the length of the cover member passage 48 in the image recording apparatus 40.

Figure 6:
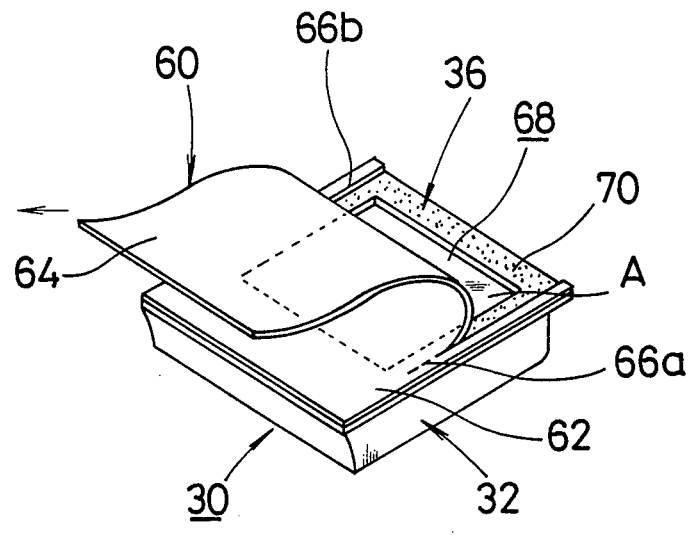
FIG. 6 is a perspective view of the sheet film package of FIG. 5, showing a cover member being peeled off.

The cover member 60 is peelably attached by adhesive to the tray 32. By coating a peelable adhesive layer 70 between the perforations 66a, 66b (FIG. 6), the cover member 60 can easily be peeled off along the perforations 66a, 66b as described later, while preventing entry of extraneous light more reliably. The distal end of the projecting portion 64 of the cover member 60 may be bent slightly upwardly for easier separation of the cover member 60 at the time the package 30 is loaded.

In operation, the projecting portion 64 of the cover member 60 of the package 30 is inserted into the opening 44 of the image recording apparatus 40 until the distal end of the projecting portion 64 is positioned in the inlet of the passage 48. Continued displacement of the package 30 in the direction of the arrow Xa causes the tray 32 and the cover member 60 to be inserted together into the opening 44, while at the same time the projecting portion 64 is pushed through the passage 48 out of the front surface of the front panel 42. The distal end of the projecting portion 64, which emerges from the passage 48, is gripped by the operator and pulled in the direction of the arrow Xb opposite to the direction of insertion of the package 30 to peel the cover member 60 off the tray 32, as illustrated in FIG. 4. At this time, the panel portion 62 of the cover member 60 can easily and reliably be separated along the perforations 66a, 66b by pulling the projecting portion 64, since the adhesive layer 70 is peelable.

In each of the foregoing two embodiments, the cover member emerges out of the front surface of the front panel of the image recording apparatus. However, the cover member may be stored in the image recording apparatus as shown in FIG. 7 that illustrates still another embodiment in which some parts corresponding to those of FIGS. 3 and 4 are denoted by corresponding reference characters with a suffix a.

Figure 7:
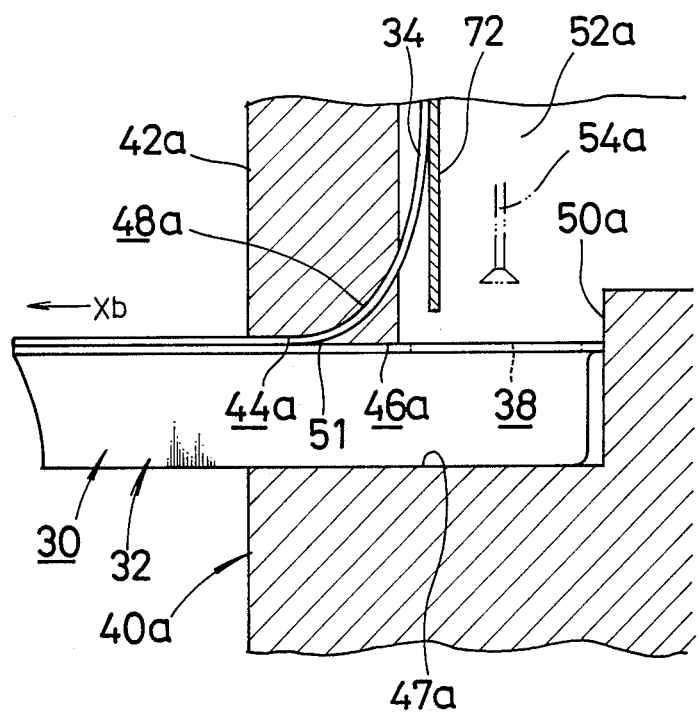
FIG. 7 is a fragmentary cross-sectional view illustrating a sheet film package of another embodiment loaded into an image recording apparatus.
Figure 8B:
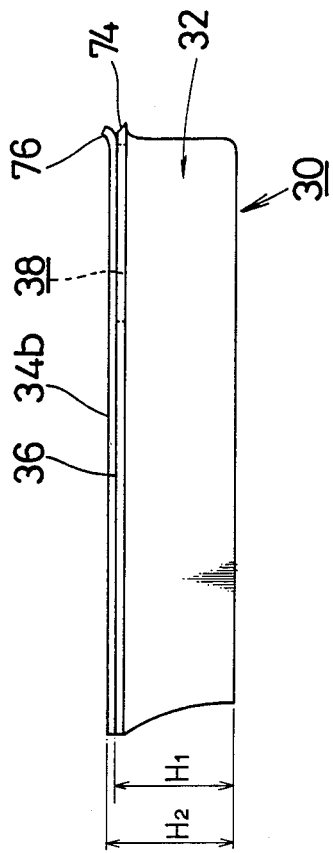
Figure 8A:
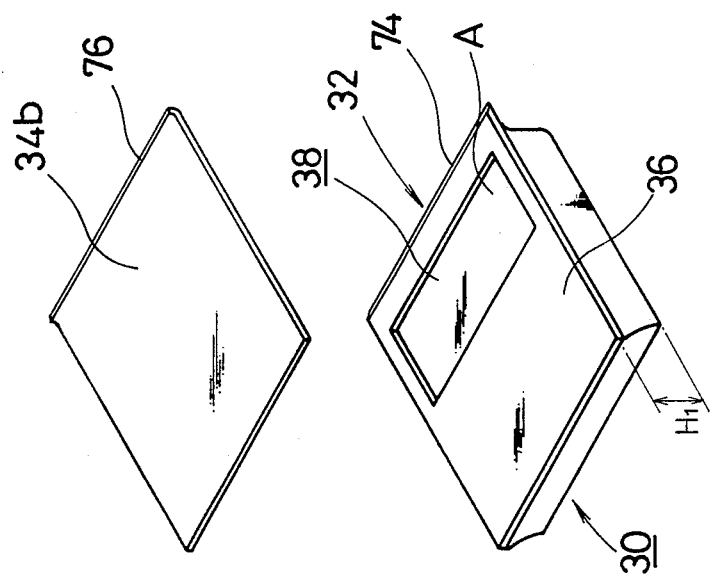
FIG. 8a is an exploded perspective view of a sheet film package according to still another embodiment, which can be accommodated in a sheet film loading device of the present invention.
Figure 9:
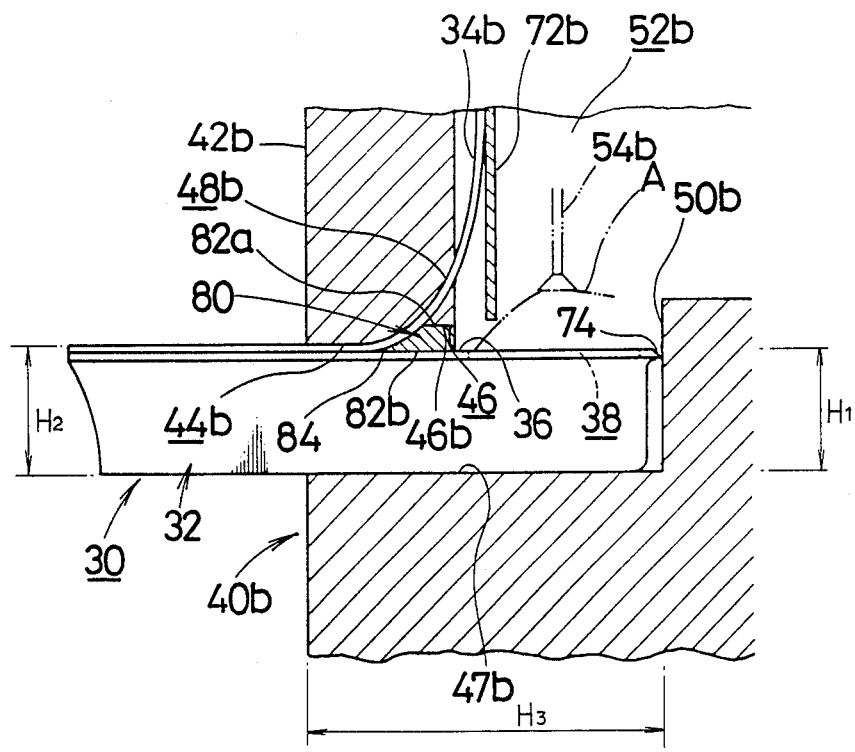
FIG. 9 is a fragmentary cross-sectional view illustrating the sheet film package of FIG. 8a loaded into an image recording apparatus.

In FIG. 7, the passage 48a defined in an image recording apparatus 40a extends arcuately from the boundary 51 between the first and second openings 44a, 46a and upwardly into the chamber 52a. A partition 72 is disposed vertically in the chamber 52a substantially along the passage 48a. The inlet of the passage 48a is partly defined by a sharp wedge-shaped edge at the boundary 51 for smoothly peeling the cover member 34 off the tray 32.

The package 30 may be loaded into the image recording apparatus 40a in substantially the same manner as described with reference to the image recording apparatus 40. However, the cover member 34 does not emerge out of the image recording apparatus 40a, but is stored in a space defined in the chamber 52a by the partition 72. When the cover member 34 is introduced into the space defined by the partition 72, the cover member 34 is guided by the partition 72 out of physical interference with the suction disk 54a as it delivers the films one by one. To remove the empty package 30 out of the image recording apparatus 40a, the tray 32 and the cover 34 are pulled out together in the direction of the arrow Xb in the same manner as described with reference to the first embodiment.

The opening 38 is shown as defined in a portion of the upper panel 36 of the tray 32. However, the opening may be defined in the entire area of the upper panel 36 of the tray 32, and the cover member 34 may be peeled off to open only portion of the opening for successive delivery of the films.

FIGS. 8a, 8b, 9 and 10 illustrate a still further embodiment of the present invention in which some parts corresponding to those of the previous embodiments are denoted by corresponding reference characters with a suffix b.

One end of the cover member 34b does not project outwardly from the distal end of the tray 32. The upper panel 36 of the tray 32 has at its distal end a slanted surface 74 inclined downwardly toward its frontal edge. The cover member 36 is peelably attached by adhesive or the like to the upper panel 36 in covering relation to the opening 38 of the tray 32. The cover member 34b is of substantially the same dimensions as those of the upper panel 36. The cover member 34b has a distal end 76 positioned over and confronting the slanted surface 74 of the tray 32, the distal end 76 being bent or curved slightly upwardly away from the slanted surface 74. The distal end 76 and the slanted surface 74 cooperate with each other in allowing a peeling means (described later) to enter easily between the upper panel 36 and the cover member 34b.

The image recording apparatus 40b in which the sheet film package is to be loaded will be described below. The image recording apparatus 40b is of essentially the same construction as that of the image recording apparatus shown in FIG. 7, except that a blade 80 is fixed to an upper wall surface 46b which defines the second opening 46 for forcibly peeling the cover member 34 off the tray 32. The blade 80 has a length that is substantially the same as the width of the package 30. The blade 80 has an upper surface 82a and a lower surface 82b which lie parallel to each other, and a cutting edge 84 formed on one end of the lower surface 82b and inclined at an angle to the upper surface 82a.

The upper surface 82a of the blade 80 is fixed as by brazing to the upper wall surface 46b with the cutting edge 84 positioned in the passage 48b having a cross-sectional shape that is substantially the same as that of the cover member 34b. The blade 80 and the second opening 46 are dimensionally selected such that the distance between the lower surface 82b of the blade 80 and a bottom surface 47b is the same as the height $H_1$ of the tray 32.

Figure 10:
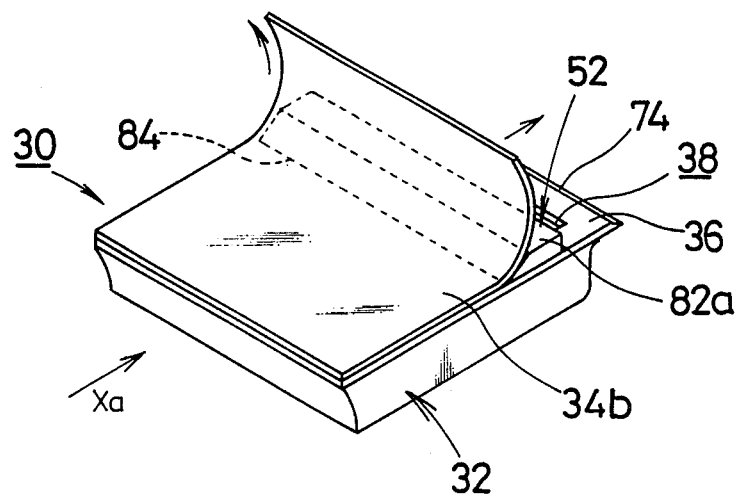
FIG. 10 is a perspective view of the sheet film package of FIG. 8a, showing a cover member being peeled off a tray.

The sheet film package and a device for loading same into the image recording apparatus 40b will operate as follows:

The package 30 is inserted from its distal end portion with the opening 38 defined therein into the opening 44b of the image recording apparatus 40. The package 30 is moved in the direction of the arrow Xa until the distal end of the package 30 abuts against the blade 80. Since the distance between the lower surface 82b and the bottom surface 47b is equal to the height $H_1$ of the tray 32, the cutting edge 84 is forcibly wedged between the distal end 76 of the cover member 34b and the slanted surface 74 upon insertion of the package 30 in the direction of the arrow Xa, thus separating the cover member 34b from the tray 32, as shown in FIG. 10. After being peeled off the tray 32, the cover member 34 which is made of a flexible material is inserted arcuately into the passage 48b. Because the opening 44b has the same width as the height $H_2$ of the package 30 and extends a certain distance into the image recording device 40b, extraneous light is prevented from entering the opening 38 of the tray 32 when the cover member 34b is peeled off the tray 32.

When the distal end of the package 30 engages an engagement surface 50b and the cover member 34 is introduced via the passage 48b into a room defined by the partition 72b, the process of loading the package 30 is finished. The opening 38 of the tray 32 can appropriately be positioned with respect to the chamber 52b inasmuch as the engagement surface 50b is spaced the distance $H_3$ from the front surface of the front panel 42b. The cover member 34b in the chamber 52b is guided by the partition 72b out of physical interference with the suction disk 54b. The sheet deliver mechanism including the suction disk 54b is then operated to deliver the sheet films A one by one from the tray 32 into the recording section (not shown).

The opening 38 is shown as defined in a portion of the upper panel 36 of the tray 32. However, the opening may be defined in the entire area of the upper panel 36 of the tray 32, and the cover member 34b may be peeled off to open only a portion of the opening for successive delivery of the films.

With the arrangement of the present invention, as described above, the film access opening is defined in the tray which stores a stack of sheet films, and the cover member is peelably attached to the tray in covering relation to the film access opening. The image recording apparatus has a peeling means such as the blade for peeling the cover member off the tray. When the package is loaded into the image recording apparatus, the cover member can automatically be peeled off the tray by the peeling means. Therefore, the films can easily be loaded into the image recording apparatus in a bright environment. Since the package is directly loaded into the image recording apparatus, any special dedicated magazine which has been employed heretofore is not required. The device for loading the films can thus be manufactured inexpensively, and is lightweight for simpler film loading operation.

Although certain preferred embodiments have been shown and described, it should be understood that many changes and modifications may be made therein without departing from the scope of the appended claims.

What is claimed is:

1. A sheet film package comprising:
   a tray for storing a stack of sheet films, said tray having a film access opening; and
   a flexible cover member peelably attached to said tray in covering relation to said film access opening for shielding the sheet films in said tray from extraneous light, wherein said cover member includes at a distal end a peeling off portion for engaging with a cover member peeling passage defined in an image recording apparatus, the arrangement being such that said cover member is peeled off said tray from said peeling off portion as said tray is inserted into said cover member peeling passage.

2. A sheet film package according to claim 1, wherein said distal end of said cover member projects toward said cover member peeling passage beyond a distal end of said tray.

3. A sheet film package according to claim 1, wherein said distal end of said cover member is bent or curved in a direction away from said tray.

4. A sheet film package according to claim 1, wherein said cover member has break-off portions for separating the cover member to open said film access opening.

5. A sheet film package according to claim 4, werein said peeling off portion of said cover member is a projecting portion projecting outwardly in the direction in which said tray is inserted into the image recording apparatus, said break-off portions being discretely arranged in said direction on opposite sides of said film access opening, the arrangement being such that said cover member can be broken along said break-off portions through said projection portion, to whereby open said film access opening upon insertion of said tray into said image recording apparatus.

6. A sheet film package according to claim 4, further including an adhesive layer disposed inwardly of said break-off portions near ends thereof, said cover member being peelably attached by said adhesive layer to said tray to cover said film access opening in light-shielding relation.

7. A sheet film package according to claim 1, wherein said tray has an upper panel in which said film access opening is defined and which has formed therein a slanted surface on one end thereof adjacent to said peeling off portion of said cover member, said cover member having substantially the same dimensions as those of said upper panal of said tray and said peeling off portion being formed as an end portion of said cover member, said end portion confronting said slanted surface and being curved away from said slanted surface.

8. A method of loading a sheet film into an image recording apparatus having a sheet delivery mechanism, a loading opening, and a passage having one end communicating with said loading opening, said method comprising the steps of:
   inserting a tray storing a stack of sheet films into said loading opening;
   position, in said passage, one end of a flexible cover member peelably attached to said tray in covering relation to a film access opening for shielding the sheet films from extraneous light; and
   moving said tray toward said sheet delivery mechanism to force said flexible cover member into said passage for thereby peeling said cover member off said tray to open said film access opening as said tray is advanced toward said sheet delivery mechanism, so that the sheet films can be delivered one by one therefrom by said sheet delivery mechanism.

9. A method according to claim 8, wherein said passage has an opposite end communicating with the exterior of th image recording apparatus, said tray being introduced into said loading opening by pulling said one end of said flexible cover member which is exposed out of the image recording apparatus.

10. A method according to claim 8, wherein said passage has an opposite end communicating with the interior of the image recording apparatus, and said one end of said flexible cover member can be positioned in the image recording apparatus through said opposite end of said passage and guided by a partition in the image recording apparatus out of physical interference with the sheet delivery mechanism.

11. A device for loading a sheet film, comprising:
   means for defining a loading opening for introducing, into an image recording section for recording an image on the sheet film, a tray storing a stack of sheet films and having a film access opening, and a cover member peelably attached to said tray in covering relation to said film access opening for shielding the sheet films in said tray from extraneous light; and
   peeling means disposed near said loading opening for peeling said cover member off as said tray is inserted int said loading opening.

12. A device according to claim 11, wherein said peeling means is disposed in said loading opening and comprises a blade positioned at a boundary between said tray and said cover member which are introduced through said loading opening.

13. A device according to claim 12, wherein said blade is fixedly mounted in said loading opening and has a width which is substantially the same as the width of said cover member that is introduced into a casing of said image recording section.

14. A device according to claim 11, further including a passage defined near said peeling means for separating said cover member from said tray.

15. A device according to claim 11, further including a partition disposed in a chamber communicating with said loading opening for guiding said cover member which has been peeled off said tray.

* * * * *